United States Patent [19]
Telefus et al.

[11] Patent Number: 5,694,304
[45] Date of Patent: Dec. 2, 1997

[54] HIGH EFFICIENCY RESONANT SWITCHING CONVERTERS

[75] Inventors: Mark Telefus, Orinda; Anatoly Shteynberg, San Jose; Sharon Pellerin, San Francisco, all of Calif.

[73] Assignee: Ericsson Raynet Corporation, Menlo Park, Calif.

[21] Appl. No.: 383,094

[22] Filed: Feb. 3, 1995

[51] Int. Cl.[6] .................................................. H02M 3/335
[52] U.S. Cl. ............................................. 363/21; 363/20
[58] Field of Search .......................... 363/20, 21, 131, 363/97, 49

[56] References Cited

U.S. PATENT DOCUMENTS

| | | | |
|---|---|---|---|
| 3,935,526 | 1/1976 | Kamata et al. | 321/2 |
| 4,246,634 | 1/1981 | Purol . | |
| 4,415,959 | 11/1983 | Vinciarelli . | |
| 4,441,146 | 4/1984 | Vinciarelli . | |
| 4,447,866 | 5/1984 | Reeves | 363/21 |
| 4,607,195 | 8/1986 | Valkestijn et al. . | |
| 4,618,919 | 10/1986 | Martin, Jr. . | |
| 4,675,797 | 6/1987 | Vinciarelli . | |
| 4,720,668 | 1/1988 | Lee et al. . | |
| 4,785,387 | 11/1988 | Lee et al. . | |
| 4,788,634 | 11/1988 | Schlecht et al. . | |
| 4,841,220 | 6/1989 | Tabisz et al. . | |
| 4,890,210 | 12/1989 | Myers | 363/21 |
| 4,953,068 | 8/1990 | Henze . | |
| 4,958,268 | 9/1990 | Nagagata et al. . | |
| 4,959,764 | 9/1990 | Bassett . | |
| 5,057,986 | 10/1991 | Henze et al. . | |
| 5,126,931 | 6/1992 | Jitaru . | |
| 5,177,675 | 1/1993 | Archer . | |
| 5,291,382 | 3/1994 | Cohen . | |
| 5,331,533 | 7/1994 | Smith . | |
| 5,459,650 | 10/1995 | Noro | 363/24 |

FOREIGN PATENT DOCUMENTS

| | | |
|---|---|---|
| 0103871 | 6/1983 | Japan . |
| 1170368 | 7/1989 | Japan . |
| 467775 | 3/1992 | Japan . |
| 4197077 | 7/1992 | Japan . |

OTHER PUBLICATIONS

Henze et al., "Zero-Voltage Switching In High Frequency Power Converters Using Pulse Width Modulation," IEEE, issue 9/88/0000-0033, pp. 33-40, 1988.

Yoshida et al., "Zero-Voltage Switching Approach For Flyback Converter," IEEE, issue 07803-0779, pp. 324-329, 1992.

Jitaru, D., "High Frequency, Soft Transitions Converter," IEEE, issue 0-7803-0982-9/93, pp. 880-887, 1993.

Liu et al., "Resonant Switches—A Unified Approach to Improve Performances Of Switching Converters.", IEEE, issue 5/48/0000-0344, pp. 344-351, 1984.

*Primary Examiner*—Peter S. Wong
*Assistant Examiner*—Rajnikant Patel
*Attorney, Agent, or Firm*—Lyon & Lyon LLP

[57] ABSTRACT

Resonant DC to DC power converter topologies include a PWM-controlled flyback converter having a single transformer and a primary side resonant subcircuit that is optimally controlled to minimize reverse recovery losses. A second transformer may be added wherein the primary windings are connected in series, the first transformer having substantially greater inductance than the second transformer to more efficiently transfer energy over a wide range of output load conditions. A combined forward-flyback resonant converter utilizing a load-side buck loop for increased power delivery performance and start-up circuitry for initial power connection of the converter to a voltage source utilizing a hysteresis protection circuit are also disclosed.

24 Claims, 11 Drawing Sheets

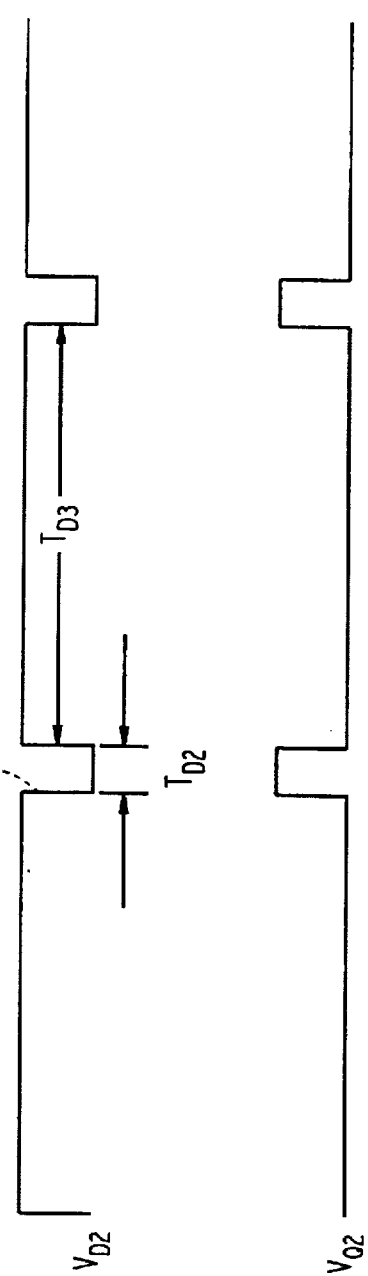
FIG. 3a-1
FIG. 3a-2
FIG. 3a-3
FIG. 3a-4

HIGH EFFICIENCY RESONANT SWITCHING CONVERTERS

BACKGROUND OF THE INVENTION

1. Field of the Invention

This invention pertains to the field of DC to DC power conversion and, more particularly, to the field of DC-DC resonant converter topologies and control circuitry.

2. Prior Art Systems and Methods

A number of DC to DC converter topologies have been invented over the years which are directed towards improving the power density and switching efficiency of power converters. An increasing focus of new topologies is to provide means to reduce or eliminate converter switching losses, while increasing the switching frequencies and, thereby, continue to reduce the size and weight of converter components. Popular topologies that provide for relatively high power density and high switching frequencies include variations of conventional forward and flyback converters, which, in addition to being relatively simple and uncluttered circuit topologies, provide for isolation of the output (or "load") voltage from the input (or "source") voltage and also provide for variable step-up or step-down voltage transformation. With the introduction of high speed composite semiconductor switches, such as metal-oxide-semiconductor-field-effect-transistor ("MOSFET") switches operated by pulse width modulation ("PWM"), recent forward and flyback topologies are now capable of being operated at greatly increased switching frequencies, —e.g., 1 Mhz and greater. However, an increase in switching frequencies can cause a corresponding increase in switching and component stress related losses, as well as increased EMI noise and switching commutation problems, due to the rapid ON/OFF switching of the semiconductor switches at high voltage and high current levels.

In an effort to reduce or eliminate the switching losses and reduce EMI noise caused by high switching frequencies, the use of "resonant" or "soft" switching techniques has been increasingly employed in the art. Resonant switching techniques generally comprise the inclusion of an LC subcircuit in series with a semiconductor switch which, when turned ON, creates a resonating subcircuit within the converter. Timing the ON/OFF control cycles of the resonant switch to correspond with particular voltage and current conditions across respective converter components during the switching cycle allows for switching under zero-voltage and/or zero-current conditions, which inherently reduces or eliminates many frequency dependent switching losses.

Many power converter topologies have been developed utilizing resonant switching techniques. For example, U.S. Pat. No. 5,057,986, entitled "Zero-Voltage Resonant Transition Switching Power Converter," by Henze et al, discloses single ended, DC-DC flyback topologies for operation at very high switching frequencies, (i.e., 1 MHz and greater), wherein a plurality of PWM operated switches are utilized to effect zero-voltage resonant transition switching. Variations of known forward and/or flyback converter topologies employing zero-voltage and/or zero-current resonant techniques are described in U.S. Pat. No. 5,126,931, entitled "Fixed Frequency Single Ended Forward Converter Switching At Zero Voltage," by Jitaru, which discloses a forward converter topology utilizing resonant switching techniques to operate at constant frequency, and in U.S. Pat. No. 5,177,675, entitled "Zero Voltage, Zero Current, Resonant Converter," by Archer, which discloses zero-voltage, zero-current switching techniques in resonant flyback topologies utilizing a resonant transformer assembly inserted in parallel with either the primary or secondary winding of the main transformer. The application of such resonant switching techniques to conventional power converter topologies offers many advantages for high density, high frequency converters, such as quasi-sinusoidal current waveforms, reduced or eliminated switching stresses and frequency dependent losses, self-commutation, and reduced EMI. However, energy losses incurred during resonant current circulation, e.g., from current dissipation across the resonant semiconductor switch, are still problematic.

For example, following each transfer of energy in a flyback converter, a "reflected" voltage is applied back across the primary side of the main transformer equal in magnitude to the output voltage times the transformer turns ratio. This reflected voltage can generate uncontrolled current circulation throughout the primary side of the converter, wherein a significant portion of the energy not transferred to the load may be lost, e.g., in the form of heat dissipation through a snubber circuit. The provision of a primary side resonant subcircuit to "capture" current generated by the reflected voltage and control its circulation represents an improvement over the previous art in that much of the reflected energy is retained via resonant circulation between a "resonant" capacitor and the main transformer inductance. However, losses due to current dissipation during resonant circulation, as well as the additional power consumption required to operate the resonant switch, can still result in unsatisfactory operating efficiency. Such losses can become significant cost considerations in converters operating at high switching frequencies, especially where power conversion is required from a relatively high voltage to a relatively low voltage over a wide range of output load conditions, where the operating efficiency of the known art is poor.

The problem of resonant circulation losses in the known art is demonstrated (if inadvertently) in an article entitled, "Zero Voltage Switching Approach For Flyback Converter", IEEE, 0-7803-0779-8/92, 1992, by K. Yoshida et al, wherein a resonant flyback converter which realizes zero-current switching of a secondary rectifying diode is disclosed ("Yoshida converter"). In the operation of the Yoshida converter, which is reproduced in FIG. 1 and described at length in conjunction with the detailed description of the present invention, current generated by the reflected voltage following each transfer of energy is allowed to circulate freely in a primary-side resonant subcircuit by use of a semiconductor switch that is left open, or "ON," following each energy transfer interval. In particular, the resulting "resonant" current circulates back and forth between a resonant capacitor and the inductance of the primary transformer winding, until the next switching cycle is to commence. Because the amount of circulating resonant current is directly related to the reflected voltage, which is fixed, and not to a particular output load condition, which is variable, resonant circulating losses are substantially identical during both heavy and light output load conditions. Thus, when measured as a percentage of the overall power transferred by the converter, losses through resonant circulation are significantly greater during light load conditions than during heavy load conditions.

Of course, one of the primary design goals in all power converters is to increase the percentage of power transferred through the converter under all output load conditions. As a practical matter, however, commercial converter efficiency, which is generally measured as a ratio of output power to input power, can be equally important. Accordingly, it is desirable to provide a high frequency DC to DC power converter topology that is efficient across a wide range of output load conditions, and, especially, under relatively light output load conditions.

Voltage and current stresses on electrical components during the initial start-up of a power converter can also decrease efficiency and impact negatively on reliability. During start-up of a power converter, the its control circuitry, which generally refers to the circuitry that operates the semiconductor switching elements of the converter, typically requires a minimum threshold voltage supply in order to commence operation of the converter; i.e., in order to start turning the converter switch(es) ON and OFF to conduct energy transfer cycles. Once the converter operation commences, voltage for the control circuitry may be derived from an auxiliary output terminal of the converter. Thus, start-up circuitry must be provided to supply an initial, threshold operating voltage to the converter.

Known start-up circuitry configurations typically rely on a "boot strap" approach, wherein a "holding" capacitor is charged by current from a voltage source, typically the same voltage source used to supply input power for the converter operation, until it is sufficiently charged to supply the required threshold voltage to the control circuitry. The control circuitry will typically include a threshold voltage gate to reject any input voltage from the holding capacitor that is less than the required threshold level, in order to avoid "false starts" of the converter. For example, where a power converter is contained on a plug-in circuit board designed for a "hot" start-up, a holding capacitor for supplying an initial voltage to the converter control circuitry is electrically connected to a voltage source at the time the circuit board is "plugged-in" to a backplane, or the like, containing the voltage source. The connection between the holding capacitor and voltage source is left in place until the holding capacitor is charged to the required threshold level for operating the converter control circuitry and the converter operation commences, wherein it is disconnected, as the converter is thereafter powered by an auxiliary output terminal.

Problems arise in the known art, however, because whether the connection is maintained between the voltage source and the holding capacitor is dependent upon the ongoing voltage level at the auxiliary output terminal, i.e., if the voltage of the auxiliary output terminal falls below the threshold operating level, the start-up connection will be re-established. Because the voltage level of the converter operation is prone to fluctuate, especially during its initial operation, the voltage supplied by the auxiliary output terminal may repeatedly drop below the threshold level, however slightly. While such drops are normally not substantial enough to cause the converter to cease operation, the connection between the holding capacitor and voltage source can undergo rapid "on/offs" due to the fluctuating converter output voltage. In addition to wasting energy, this type of rapid on/off commutation can be harmful to the impacted electrical components, especially since the voltage level of the voltage source is generally much higher than the threshold converter operating voltage, (e.g., a voltage source is typically at least 110 volts in commercial applications and often much greater, whereas the threshold operating voltage of the converter control circuitry is typically around 12 volts). While voltage regulation means can be used to reduce the voltage level between the voltage source and the holding capacitor to a reasonably "safe" level, because of the energy lost and heat generated by such means, it is still desirable to limit the duration of time in which the connection between the voltage source and the holding capacitor is maintained.

Thus, it is desirable to provide start-up circuitry that will keep the converter control circuitry operating efficiently and reliably, in spite of initially fluctuating converter output voltages.

SUMMARY OF THE INVENTION

According to a first aspect of the invention, a resonant flyback DC-DC converter topology is provided with a single transformer and a main semiconductor switch ("main switch") to periodically connect a primary winding of the transformer with a voltage source. In preferred embodiments, the converter is provided with a primary-side "resonant" capacitor and a second semiconductor switch ("resonant switch"), respectively, which form a resonating subcircuit with the primary transformer winding. To operate the converter, the main switch is alternately caused to be turned ON and OFF, preferably by a PWM voltage control signal. When the main switch is turned ON, current flows from the voltage source through the primary winding, with energy being stored by the inductance of the transformer core. When the main switch is turned OFF, the transformer core reverses polarity and the stored energy is released in the form of a resonating current, which first charges the parasitic capacitance of the main switch and then begins resonating with the resonant capacitor. The released resonant current also causes one or more secondary rectifying diodes to forward bias and thereby allow the current to change one or more secondary load terminals, each via a respective output rectifying diode. The resonant switch, which is also preferably controlled by a PWM voltage control signal, remains OFF during each transfer of energy to the secondary. As such, the resonant current between the primary transformer inductance and resonant capacitor is limited to "uni-directional" conduction via the body diode element of the resonant semiconductor switch.

A load storage, or "filter" capacitor is preferably provided to regulate the output power across each output load terminal. When the load storage capacitors are sufficiently charged, the output rectifying diode(s) reverse bias, and a reflected voltage is applied back across the primary transformer winding, generating additional resonant current. Because the resonant switch remains OFF, however, the additional resonant current remains restricted to uni-directional conduction via the body diode element of the resonant switch, thereby minimizing resonant circulation losses. In preparation for the next energy transfer cycle, the resonant switch is finally turned ON, but only for the limited period of time required to release the charge stored in the resonant capacitor back into the transformer winding, upon which the resonant switch is immediately turned OFF.

With both switches OFF, the polarity of the charge stored by the parasitic capacitance of the main switch will cause current to be released from the transformer back to the voltage source, via a reverse (i.e., "counterclockwise") current circulation, until the parasitic capacitance of the main switch is fully discharged. The main switch is then turned ON for initiating the next power transfer cycle under a zero-current condition. In this manner, the invention provides a resonant flyback topology that can achieve zero-current switching across the output rectifying diode(s) and zero-current switching of the main switch, while minimizing resonant operating and circulation losses.

In another aspect of the invention, a second transformer is added to the aforedescribed resonant flyback topology, each transformer having a single primary winding, with one of the transformers being substantially smaller than the other. The respective primary windings of the two transformers connected in series, with the primary winding of the smaller transformer being configured with substantially fewer turns than the primary winding of the larger transformer, the inductance of the smaller transformer thereby being substantially greater than the inductance of the larger transformer. Because the energy stored in each of the transformers and, therefore, the energy made available to be transferred to the load, is directly proportional to the transformer's inductance, the smaller transformer will supply substantially all of the output energy during periods of relatively light output load conditions. During periods of relatively heavy output load conditions, however, the resulting larger current will saturate and, effectively, short circuit the smaller transformer, wherein only the inductance of the larger transformer will impact on the operation of the converter.

The secondary windings of the transformers are preferably connected in parallel, so that energy transferred from either transformer core can be distributed through either secondary winding to various load storage capacitors and/or output load terminals. In addition, the relatively high inductance of the smaller transformer will reduce the magnetizing current passing through it, thereby reducing resonant circulation generated by the reflected voltage following each transfer of energy during periods of light output load conditions. Thus, this aspect of the invention provides a resonant flyback topology having an effective variable transformer inductance, thereby providing increased power delivery efficiency under light output load conditions without compromising the ability to serve relatively heavy output load conditions.

In yet another aspect of the invention, a combined forward-flyback converter is provided with a single transformer, the transformer having a single primary winding and a pair of secondary windings. The secondary windings are connected in parallel, with one secondary winding being forward-polarity and the other being flyback-polarity, respectively. A main semiconductor switch is provided to periodically electrically couple the primary transformer winding to a voltage source. When the main switch is ON, current from the voltage source is both stored in the transformer core via the flyback-polarity secondary winding, and transferred to the secondary via the forward-polarity secondary winding. Energy transferred through the forward-polarity secondary winding charges a load-side storage inductor, which supplies power to one or more output load terminals. When the main switch is turned OFF, the resonant flyback operation previously described takes place, via a transfer of energy stored in the transformer core to a load-side storage capacitor, which also supplies power to the one or more output terminals. Energy stored in the load storage inductor will simultaneously discharge current to the load, the inductor thereby operating as a "buck-loop" in parallel with the flyback load storage capacitor. By utilizing both forward and flyback switching techniques, this aspect of the invention provides a DC-to-DC power converter with increased utilization of its magnetic energy transfer system.

In yet another aspect of the invention, start-up circuitry is provided to establish an initial threshold voltage supply derived from a voltage source to the control circuitry of a power converter. In preferred embodiments, a lead from the voltage source is connected via a first semiconductor switch to a holding capacitor, which supplies voltage to the converter control circuitry. Once the holding capacitor is sufficiently charged to provide the required threshold voltage to the control circuitry, the converter operation commences and a voltage supply for the control circuitry may thereafter be provided from an auxiliary output terminal. According to the invention, an output lead from the holding capacitor is also input into a voltage comparator, which compares the voltage level to a reference voltage, wherein a voltage level less than the reference voltage will cause the comparator to output a low voltage signal, and a voltage that equals or exceeds the reference voltage will cause the comparator to output a high voltage signal. Voltage dividing means are provided between the holding capacitor and the comparator to reduce the voltage level from the holding capacitor by a predetermined ratio, such that when the holding capacitor is initially charged to the threshold operating voltage of the control circuitry, the input voltage at the comparator will reach the reference voltage and the comparator will switch from low to high output voltage signals. The comparator output signal is applied to the operating gate of a second semiconductor switch, the low output voltage signal being less than the second switch gate voltage and the high output voltage signal equal to or exceeding the second switch gate voltage, turning the second switch ON. When the second switch is ON, it electrically connects the operating gate of the first switch directly to ground. This causes the first switch to turn OFF, thereby disconnecting the voltage source from the holding capacitor. In this manner, the electrical connection between the voltage source and the holding capacitor is broken once the holding capacitor is first charged to the threshold operating voltage of the converter control circuitry.

The comparator output voltage signal is also connected, via a feedback loop, to the comparator input. A resistor is inserted in the feedback loop path, which acts in parallel with the voltage dividing means provided between the holding capacitor and the comparator to create a hysteresis at the comparator input, such that, once the voltage level of the holding capacitor first reaches the threshold converter operating voltage and the comparator output voltage signal changes from low to high state, the high output state will remain in place even if the voltage level of the holding capacitor drops back below the threshold converter operating voltage. In preferred embodiments, the value of the hysteresis is selected large enough to prevent normal fluctuations in the output voltage of the power converter to cause the voltage source to be re-connected to the holding capacitor, or otherwise impact on the on-going operation of the control circuitry. In this manner, the inventive start-up circuitry prevents the connection between the voltage source and holding capacitor from encountering rapid on/offs, thereby minimizing undue stress and related losses on impacted electrical components.

Thus, it is an object of the invention to provide DC-to-DC converter topologies capable of achieving increased power efficiency and delivery over a wide range of output load conditions, with improved start-up performance and reliability.

As will be apparent to those skilled in the art, other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings illustrate both the design and utility of preferred embodiments of the present invention, in which:

FIGS. 1a–1 to 1a–5 are switching control signals and selected current waveforms of the converter of FIG. 1, when supplying power across a single output terminal;

FIGS. 1b–1 to 1b–5 are switching control signals and selected current waveforms of the converter of FIG. 1, when supplying power across multiple output terminals;

FIG. 2 is a schematic diagram of a resonant flyback converter, illustrating features of one aspect of the invention;

FIGS. 2a–1 to 2a–5 are switching control signals and selected current waveforms of the converter of FIG. 2;

FIG. 3 is a schematic diagram of switching control circuitry for generating the switching control signals illustrated in FIG. 2a–1 to 2a–5;

FIGS. 3a–1 to 3a–4 are output voltage signals of the switching control circuitry of FIG. 3;

FIG. 4 is a schematic diagram of a resonant flyback converter, illustrating the features of another aspect of the invention;

FIG. 5 is a schematic diagram of a combined forward-flyback converter, illustrating the features of yet another aspect of the invention;

FIGS. 5a–1 to 5a–4 are switching control signals and selected current waveforms of the converter of FIG. 5.

DETAILED DESCRIPTION OF THE PREFERRED EMBODIMENTS

Figure 1:
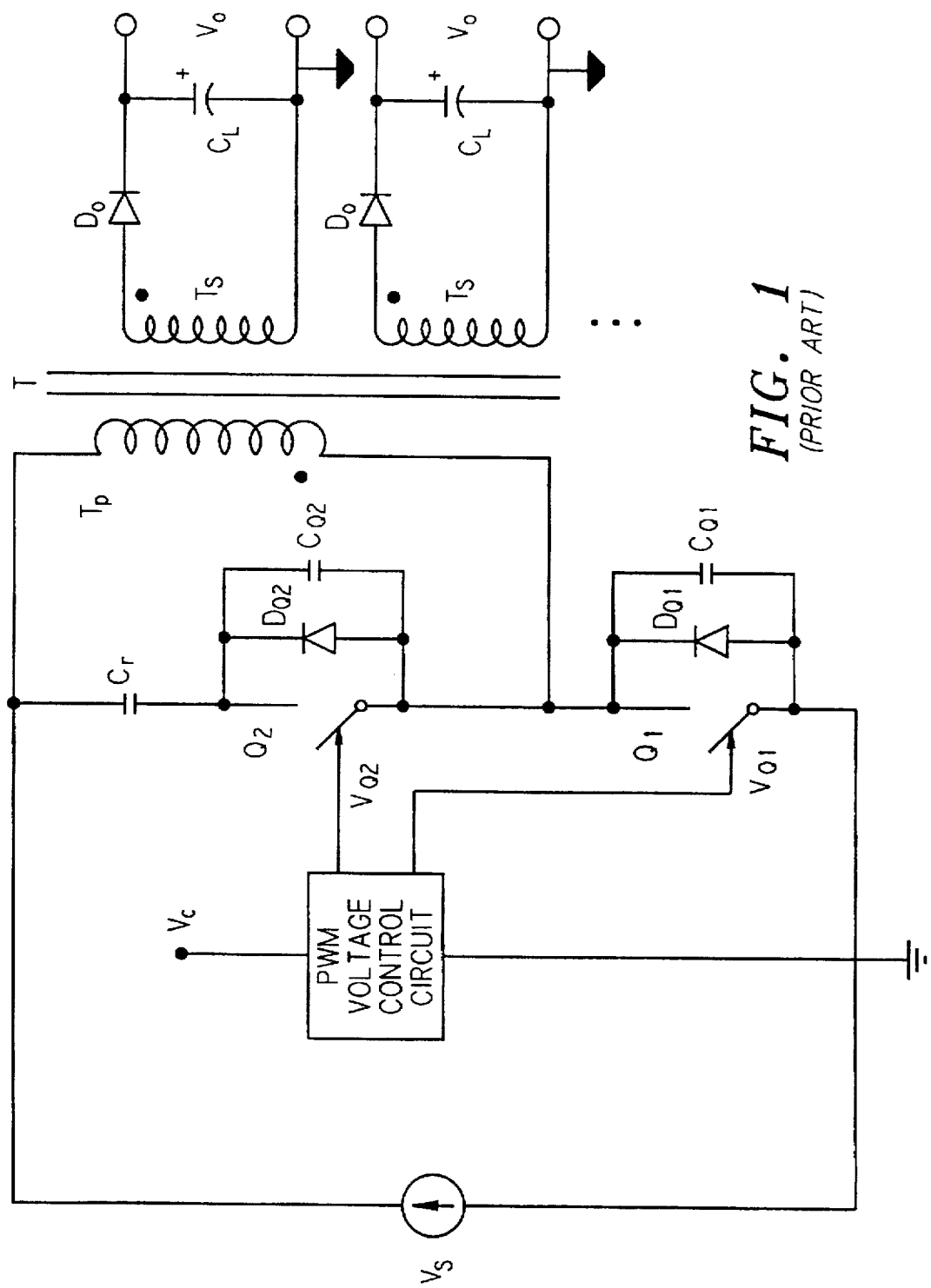
FIG. 1 is a schematic diagram of a prior art resonant flyback converter described in the Yoshida et al article.
Figures 1, 1A:
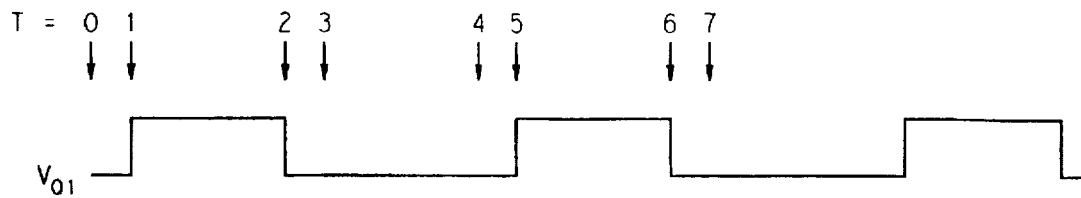

FIG. 1 depicts the Yoshida converter topology configured for supplying regulated DC power from a voltage source $V_s$ to a plurality of output voltage terminals $V_o$. The Yoshida converter comprises a single transformer T, which isolates the voltage source $V_s$ from the output voltage terminals $V_o$. A first semiconductor switch $Q_1$ is provided ("main switch"), which, when ON, electrically couples a primary winding $T_p$ of the transformer with the voltage source $V_s$. The main switch $Q_1$ is operated by a first pulse-width-modulated ("PWM") voltage control signal $V_{Q1}$, which is generated by a PWM voltage control circuit. The converter includes a primary-side resonant subcircuit, comprising a resonant capacitor $C_r$ and a second semiconductor switch $Q_2$ ("resonant switch") operated by a second PWM voltage control signal $V_{Q2}$, also generated by the PWM voltage control circuit. When ON, the resonant switch $Q_2$ allows bi-directional current circulation between the primary winding $T_p$ and resonant capacitor $C_r$. The secondary, or "load" side of the converter includes a plurality of secondary transformer windings, each supplying current to a respective output rectifying diode $D_o$. Each diode $D_o$ supplies current to a respective load storage capacitor $C_L$, for providing continuous, regulated power across each respective output terminal $V_o$.

The present inventors studied and operated the Yoshida converter in a laboratory environment and determined that it was most efficient when supplying power only to a single output load terminal. Thus, operation of the Yoshida converter is demonstrated herein, both when supplying a single output terminal and when supplying multiple output terminals. Operation of the Yoshida converter when supplying a single output terminal $V_o$ is best demonstrated in conjunction with the switching control signals and current waveforms illustrated in FIG. 1a–1 to 1a–5, as follows:

Initially, at t=0, both $Q_1$ and $Q_2$ are OFF, following completion of a previous energy transfer cycle. From t=0 until t=1, a charge primarily stored in the parasitic capacitance $C_{Q1}$ of the main switch $Q_1$ is released via "reverse" current circulation, i.e., counterclockwise from $Q_1$, through the primary transformer winding $T_p$, and back to the voltage source $V_s$. At t=1, the parasitic capacitance $C_{Q1}$ is fully discharged and voltage control signal $V_{Q1}$ applies a positive voltage pulse to the operating gate of $Q_1$, causing $Q_1$ to turn ON. When $Q_1$ is ON, current circulates in a "forward" or "clockwise" direction from the voltage source $V_s$, through primary winding $T_p$, with energy stored in the transformer core by its inductance due to the magnetic field created by the current circulation through the primary transformer winding.

At t=2, voltage control signal $V_{Q1}$ returns to zero voltage and $Q_1$ turns OFF. The magnetic field of the transformer collapses and the core reverses polarity, wherein energy stored therein is released in the form of a resonating current, which first charges the parasitic capacitance $C_{Q1}$ of the main semiconductor switch $Q_1$, and then begins resonating with the resonant capacitor $C_r$. The released resonant current forward biases the output rectifying diode $D_o$, allowing current to pass through $D_o$ and charge the load storage capacitor $C_L$. Because energy released from the primary winding $T_p$ is initially drawn to charge parasitic capacitance $C_{Q1}$, zero-current switching of the output rectifying diode $D_o$ is accomplished; —i.e., $D_o$ is forward biased before current passes through it, with current passing through $D_o$ in a quasi-sinusoidal wave form.

During this energy transfer period, some of the energy stored in the transformer T will return to the resonant capacitor $C_r$ as part of an ongoing resonant current circulation between the two components, instead of transferring to the secondary. In particular, current resonates between the inductance of the primary winding $T_p$ and the resonant capacitor $C_r$, first via limited, "uni-directional" conduction through the body diode element $D_{Q2}$ of the resonant switch $Q_2$, which is initially OFF. Then, at t=3, switch $Q_2$ is turned ON by a positive voltage pulse from voltage control signal $V_{Q2}$, and the resonant current is allowed to undergo unrestricted "bi-directional" circulation between the primary winding and resonant capacitor via the channel (or "switch") path of resonant switch $Q_2$.

Once the load storage capacitor $C_L$ is sufficiently charged, its increased voltage level relative to the voltage across the secondary winding $T_s$ causes the output rectifying diode $D_o$ to reverse bias, preventing further current circulation through $D_o$ and applying a reflected voltage $V_{refl}$ back across the primary winding $T_p$, which is equal in magnitude to the output voltage $V_o$ times the transformer turns ratio N, where $N=T_p/T_s$. The reflected voltage generates additional resonant current, which charges the resonant capacitor $C_r$ via additional resonant current from the primary transformer winding, adding current to the ongoing bi-directional resonant circulation between the resonant capacitor $C_r$ and the primary winding $T_p$, with the resonant capacitor $C_r$ repeatedly storing and releasing energy. Some of the energy is lost, however, with each resonant circulation, due to current dissipation through the resonant switch $Q_2$. Further energy is consumed by the continued positive voltage pulse generated in voltage control signal $V_{Q2}$, which is required in order to maintain $Q_2$ ON to accommodate the bi-directional resonant current circulation.

$Q_2$ is left ON until just prior to the next switching cycle when, at t=4, voltage control signal $V_{Q2}$ returns to zero voltage, and $Q_2$ is turned OFF. Because the converter is supplying a single output terminal and, more particularly, via a single output rectifying diode, voltage control signal

9

$V_{Q2}$ can be timed to turn $Q_2$ OFF at an instant that $C_r$ is fully discharged. With both $Q_1$ and $Q_2$ OFF, the charge stored by the parasitic capacitance $C_{Q1}$ of $Q_1$ will release via reverse (counter-clockwise) circulation through the primary winding $T_p$, back to the voltage source $V_s$. At t=5, with $C_{Q1}$ fully discharged and the current across $Q_1$ is zero, $Q_1$ is turned ON by $V_{Q1}$, commencing a new power transfer switching cycle. With $C_r$ fully discharged, there is zero voltage across $Q_2$ and its body diode $D_{Q2}$ will no longer conduct current. As such, $Q_1$ may be timed to turn ON without cross-conduction losses from current circulating across $Q_2$.

The above described operation of the Yoshida converter was with respect to a single output application, under a relatively low power operation, i.e., with negligible transformer leakage inductance. However, when the converter is used to supply multiple output applications, especially in high power applications where leakage inductance of the transformer becomes a factor, the amount of energy that is alternately stored and released between the resonant subcircuit components, (i.e., in the form of bi-directional resonant current circulation), becomes uncontrollable with, as can be seen in FIGS. 1b–1 to 1b–5, at least some of the energy remaining in the resonant subcircuit after $Q_2$ is turned off, thereby preventing the secondary current from completing its discharge cycle and causing switches $Q_1$ and $Q_2$ to cross-conduct. Under such conditions, selecting an accurate "shut-off" timing of resonant switch $Q_2$ becomes difficult, if not impossible, with respect to avoiding cross-conduction with the main switch $Q_1$.

Figures 1, 1A, 2:
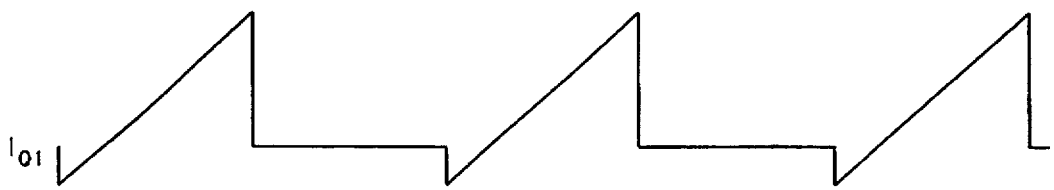

FIG. 2 illustrates an improved arrangement of the Yoshida converter where, according to the invention, the resonant capacitor $C_r$ is positioned between the resonant switch $Q_2$ and the main switch $Q_1$, configured in parallel with primary winding $T_p$, in order to preserve at least one side of resonant switch $Q_2$ on a "quiet point" of the circuit, so that its parasitic capacitance $C_{Q2}$ has a negligible impact on the operation of the converter. Operation of the converter illustrated in FIG. 2 is best described in conjunction with the innovative switching control signals and resulting current waveforms illustrated in FIGS. 2a–1 to 2a–5, as follows:

At t=1, PWM voltage control signal $V_{Q1}$ applies a positive voltage pulse to the operating gate of $Q_1$, causing $Q_1$ to turn ON, thereby allowing positive (clockwise) current circulation from the voltage source $V_s$ through the primary winding $T_p$, with energy stored in the transformer T by its inductance due to the magnetic field created across the transformer by current circulation through $T_p$. At t=2, voltage control signal $V_{Q1}$ returns to zero voltage and the main switch $Q_1$ turns OFF. The transformer core reverses polarity and the stored energy is released in the form of a resonating current, which first charges the parasitic capacitance $C_{Q1}$ of main switch $Q_1$ and then begins charging the resonant capacitor $C_r$. The resonant current forward biases output rectifying diode $D_o$, allowing the current to pass through $D_o$ and charge the load storage capacitor $C_L$. As with the Yoshida operation, which to this point is identical, because energy released from the primary winding $T_p$ is initially drawn to charge parasitic capacitance $C_{Q1}$, zero-current switching of the output rectifying diode $D_o$ is accomplished.

Preferably, the capacity of $C_{Q1}$ is substantially less than that of $C_r$, which itself is preferably substantially less than the capacity of $C_L$, such that the relative time to fully charge each respective capacitor may be represented by:

$$t(C_L) \gg t(C_r) \gg t(C_{Q1}),$$

where $t(C_x)$ represents the time required to charge each respective capacitor $C_x$. Preferably, the capacity of $C_L$ is large enough to ensure low ripple output voltage.

10

According to a first aspect of the invention, the resonant switch $Q_2$ is left OFF, i.e., voltage control signal $V_{Q2}$ outputs a steady-state zero voltage signal, during the entire transfer of energy to the secondary. Thus, as can be seen in FIGS. 2a–1 to 2a–5, when the main switch $Q_1$ is turned off, energy stored in the transformer T "partially" charges $C_{Q1}$, and then begins resonating between the resonant capacitor $C_r$ and primary transformer inductance, while, at the same time, creating a sufficient voltage across the secondary to forward bias output rectifying diode $D_o$ and allow for the transfer of energy to supply the output load. In a preferred embodiment, $C_L$ becomes sufficiently charged to reverse bias $D_o$ at a point when the output current $I_{Do}$ is at its maximum amplitude in the form of a sine wave. Energy generated by the reflected voltage charges the resonant capacitor $C_r$ via uni-directional current circulation from the transformer through body diode $D_{Q2}$ of the resonant switch $Q_2$. Preferably, the resonant capacitor $C_r$ is sized so that, once fully charged by the reflected voltage, it is able to complete a single resonant discharge back to the transformer, thereby driving the secondary current waveform back to zero in the sine wave, via reverse current circulation through the body diode $D_{Q2}$ due to the "reverse recovery" phenomena of the resonant semiconductor switch $Q_2$. Preferably, $Q_2$ is selected with a reverse recovery time sufficient to drive the secondary current to zero, while restricting further resonant circulation and accompanying current losses.

At t=3, resonant switch $Q_2$ is turned ON by a positive voltage pulse from voltage control signal $V_{Q2}$, for the limited period of time required to release the charge stored in $C_r$, which is accomplished via counter-clockwise circulation from the resonant capacitor $C_r$ to the primary winding $T_p$. At t=4, the resonant capacitor $C_r$ is fully discharged into the primary winding and the voltage control signal $V_{Q2}$ returns to zero voltage, turning OFF $Q_2$. The actual time period for the resonant capacitor $C_r$ to fully discharge, i.e. the time period between t=3 and t=4, is determined by the resonant frequency characteristic of $C_r$ and the inductance of the transformer T. Once $C_r$ is fully discharged, the current through the resonant switch $Q_2$ is zero and its body diode $D_{Q2}$ will no longer conduct. The charge stored by parasitic capacitance $C_{Q1}$ will then discharge, via reverse (counter-clockwise) circulation through primary winding $T_p$, back to the voltage source $V_s$. In preferred embodiments, because $C_r \gg C_{Q1}$, $C_{Q1}$ will not release any of its stored charge until after $C_r$ is fully discharged and $Q_2$ is OFF. Because of the "reverse" polarity caused by the charge stored in $C_{Q1}$, current also circulates from the transformer back to the voltage source, until at t=5, with $C_{Q1}$ fully discharged and the current $I_{Q1}$ across main switch $Q_1$ at zero, main switch $Q_1$ is again turned ON by a positive voltage pulse from voltage control signal $V_{Q1}$, commencing a new switching cycle. By strictly controlling the ON time of resonant switch $Q_2$, the present invention allows the secondary current to complete its cycle (i.e., reach zero), while still preventing energy from remaining in $Q_2$ prior to the commencement of each new transfer cycle, thereby avoiding the wasteful cross conduction of switches $Q_1$ and $Q_2$.

Figures 1, 1A, 2, 3:

FIG. 3 illustrates a preferred embodiment of the PWM voltage control circuit used to generate the voltage control signals $V_{Q1}$ and $V_{Q2}$, respectively, illustrated in FIGS. 2a–1 to 2a–3, to operate the power converter of FIG. 2. The design and operation of the PWM voltage control circuit is best described in conjunction with the output voltage signals illustrated in FIGS. 3a–1 to 3a–4, as follows:

The control unit comprises a pulse-width-modulated ("PWM") signal generator, which outputs a PWM signal $V_{PWM}$. $V_{PWM}$ comprises periodic, positive voltage pulses, each of duration $T_{ON}$, with each pulse followed by a zero-voltage or "dead time" period of duration $T_{OFF}$. A first lead carrying voltage control signal $V_{PWM}$ is passed through a non-inverting buffer $B_1$, which outputs a corresponding voltage control signal $V_{Q1}$, which is directly applied to the operating gate of main switch $Q_1$ in FIG. 2.

A second lead carrying signal $V_{PWM}$ is input into a first voltage pulse circuit $D_1$, comprising, for example, a retriggerable monostable multivibrator, which generates a responsive voltage signal $V_{D1}$. $V_{D1}$ comprises periodic positive voltage pulses, each pulse starting with a leading edge from a corresponding pulse in signal $V_{PWM}$ and, by use of a first selected delay circuit $L_1C_1$, continuing for a time interval $T_{D1}$. In preferred embodiments, $T_{D1}$, which is determined by the characteristics of $L_1$ and $C_1$, is selected to equal the sum of time intervals $T_{ON}$ and $T_{OFF}$, less the required time to discharge the resonant capacitor $C_r$ and parasitic capacitance $C_{Q1}$ of main switch $Q_1$, respectively, following each energy transfer cycle of the converter; (i.e., $T_{D1}$ is equal to the time interval between t=1 and t=3 in FIG. 2a–1 to 2a–5).

Signal $V_{D1}$ is input into a second voltage pulse timing circuit $D_2$, also comprising, for example, a retriggerable monostable multivibrator, which generates a responsive voltage signal $V_{D2}$. $V_{D2}$ comprises periodic "low" (or "negative") voltage pulses, each pulse starting with a trailing edge of a corresponding pulse in signal $V_{D1}$ and, by use of a second selected delay circuit $L_2C_2$, continuing for a time interval $T_{D2}$. In preferred embodiments, $T_{D2}$, which is determined by the characteristics of $L_2$ and $C_2$, is selected to equal the time required to transfer the charge stored in the resonant capacitor $C_r$ following each energy transfer cycle to the transformer core; (i.e., $T_{D2}$ is equal to the time interval between t=3 and t=4 in FIGS. 2a–1 to 2a–5). $V_{D2}$ is passed through an inverting buffer $B_2$, which outputs a corresponding, inverted (or "positive") voltage control signal $V_{Q2}$, which is directly applied to the operating gate of resonant switch $Q_2$ in FIG. 2. Preferably, the duty cycle of signal $V_{PWM}$ is selected such that a further time delay $T_{RQ2}$ occurs between each voltage pulse of $V_{Q2}$, where $T_{RQ2}$ is the recovery time of switch $Q_2$, in order to prevent the cross-conduction of main switch $Q_1$ and resonant switch $Q_2$. As such, each OFF, or zero-voltage dead time $T_{D3}$ of $V_{Q2}$ is equal to $T_{D1}+T_{RQ2}$.

As can be seen, selecting proper values for $L_1$, $C_1$, $L_1$ and $C_2$, respectively, is critical for achieving the precise, required timing for turning resonant switch $Q_2$ ON and OFF, where $T_{D1}$ is proportional to $(L_1*C_1)^{1/2}$, and $T_{D2}$ is proportional to $(L_2*C_2)^{1/2}$, respectively. Thus, because of the (typically) extremely short time intervals involved, use of LC time constants is preferable to use of RC time constants, which are less stable.

Figure 6:
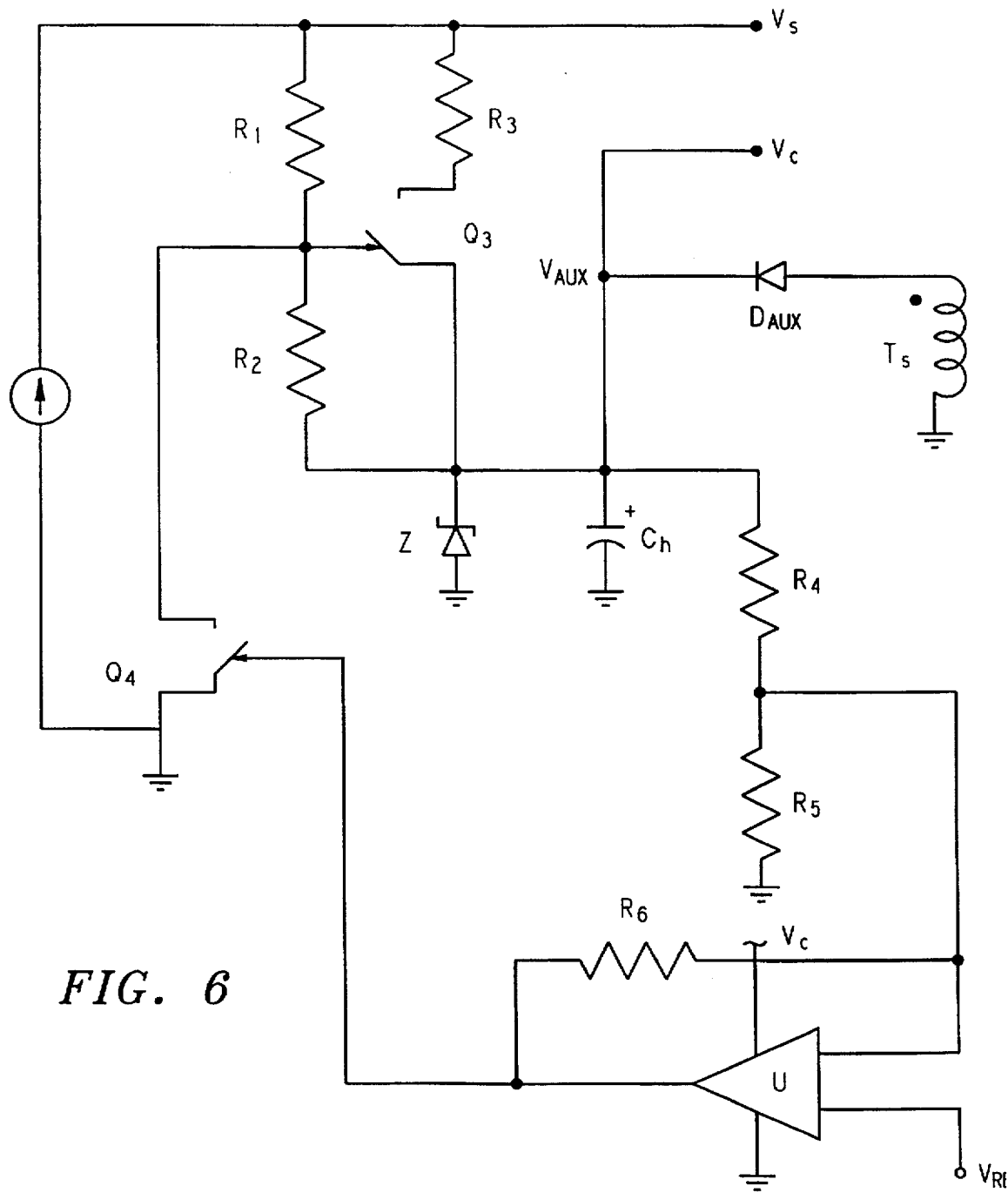
FIG. 6 is a schematic diagram of start-up circuitry for a converter operation, illustrating the features of yet another aspect of the invention.

Preferably, the input voltage supply $V_c$ for the voltage control circuit is received from an auxiliary output terminal $V_{aux}$ of the converter, except during initial start-up of the converter, wherein voltage may be supplied in a manner described in conjunction with FIG. 6.

Figures 1, 1A, 2, 3, 4:
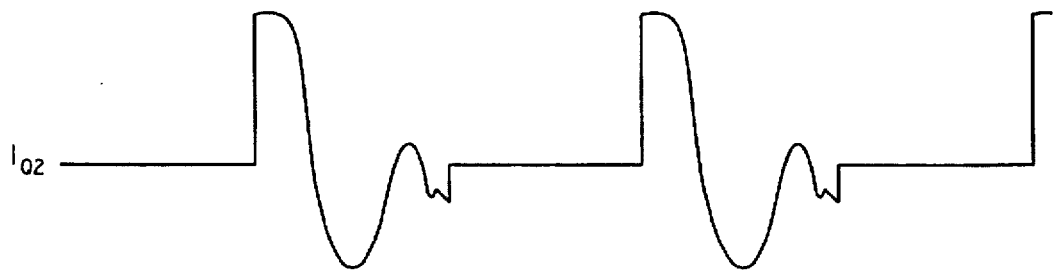

FIG. 4 illustrates an alternate embodiment of the resonant flyback topology of FIG. 2, wherein a second transformer $T_2$ is provided. In the embodiment shown, $T_1$ is substantially smaller than $T_2$, i.e., primary winding $T_{p1}$ has substantially fewer turns than primary winding $T_{p2}$, and the magnetic core of $T_1$ is correspondingly smaller than the core of $T_2$. As such, under light load conditions, the inductance $L_1$ if $T_1$, related to the number of turns of $T_{p2}$, is substantially greater than the inductance $L_2$ of $T_2$. Notably, primary windings $T_{p1}$ and $T_{p2}$, respectively, are connected in series and thus, conduct the same current I.

The energy E stored in each transformer and, therefore, the energy made available to be transferred to the secondary, is directly related to its inductance. Specifically, energy $E_1$ and $E_2$ transferred by transformers $T_1$ and $T_2$, respectively, can be calculated as follows:

$$E_1=I^2*L_1/2 \text{ and } E_2=I^2*L_2/2.$$

Preferably, secondary windings $T_{S1}$ and $T_{S2}$, respectively, are connected in parallel, so that energy transferred from either primary winding may be evenly distributed through the secondary side of the converter; i.e., to load storage capacitors $C_1$ and $C_2$, respectively, in the embodiment shown. In addition, the relatively high inductance of the smaller transformer $T_1$ will reduce current I at light loads, thereby further reducing resonant circulating losses. In effect, $T_1$ acts as a "small" auxiliary inductor to $T_2$, which enhances the performance of the flyback converter during periods of light output load conditions.

During periods of relatively heavy output load conditions, however, the resulting larger current will saturate and, effectively, short circuit transformer $T_1$, wherein only the characteristics of the larger transformer $T_2$ will impact on the operation of the converter. In particular, as the converter output load increases, the smaller transformer $T_1$ will move closer to saturation, loosing its inductance. At a given "cross-over" load level, the inductance $L_1$ of the small transformer $T_1$ becomes negligible and the inductance $L_2$ of the large transformer $T_2$ becomes prevailing. Notably, as the output load level approaches the cross-over level, the redistribution of energy from $T_1$ to $T_2$ will relieve some of the saturation of $T_1$, thereby maintaining a substantially constant volt/second area across both transformers during an increase in the output load, minimizing the impact of the saturation of $T_1$. Actual sizing of $T_1$ and $T_2$, and their respective primary windings $T_{p1}$ and $T_{p2}$, is dependent upon the desired converter output load range and operating efficiency.

Figures 1, 1A, 2, 3, 4, 5:
Figures 1, 1B:
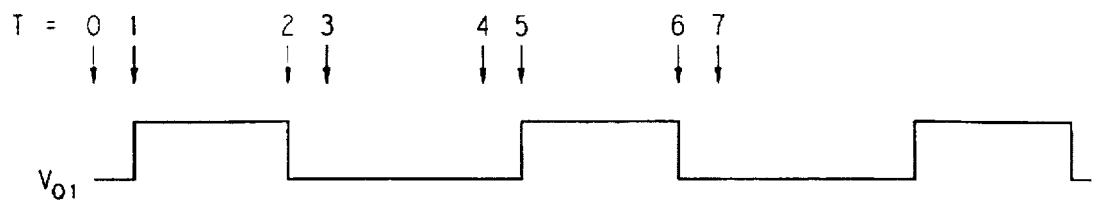
Figures 1, 1B, 2:
Figures 1, 1B, 2, 3:
Figures 1, 1B, 2, 3, 4:
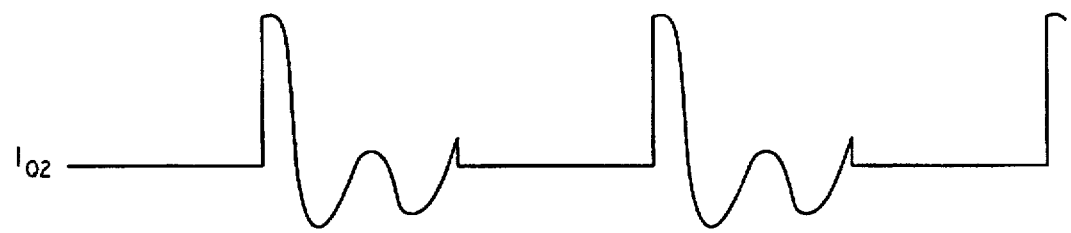
Figures 1, 1B, 2, 3, 4, 5:
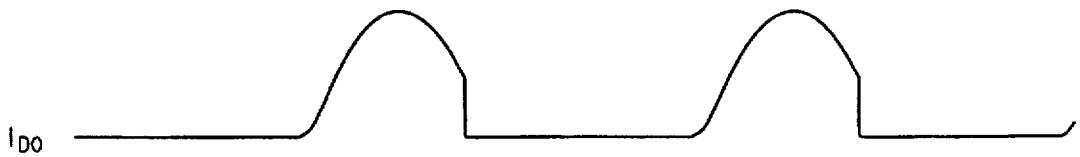
Figure 2:
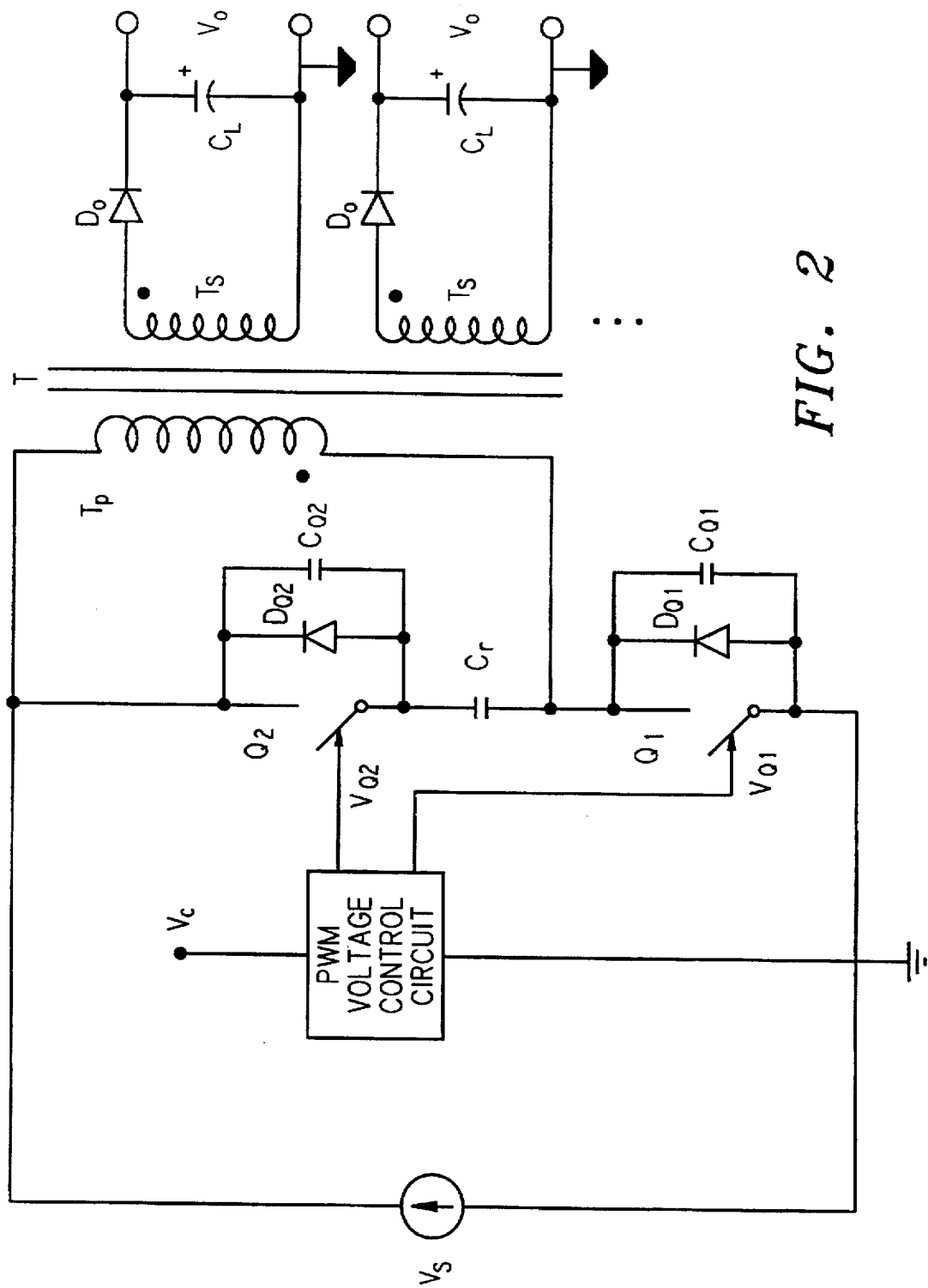
Figures 1, 2A:
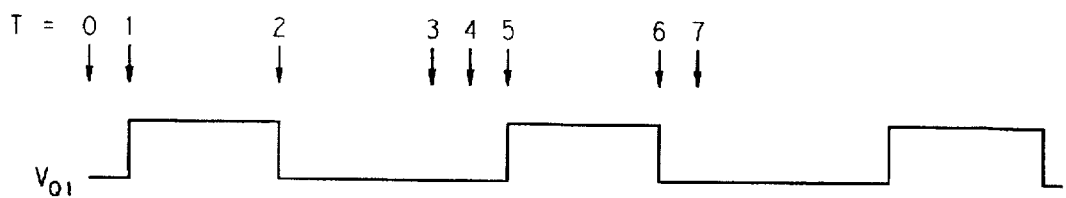
Figures 2, 2A:
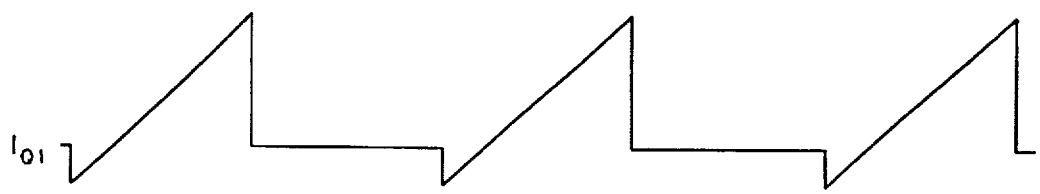
Figures 2, 2A, 3:
Figures 2, 2A, 3, 4:
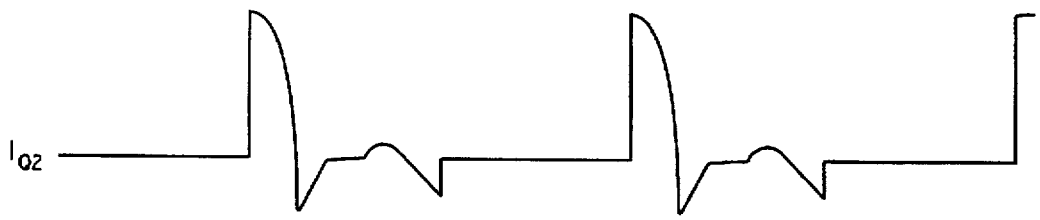
Figures 2, 2A, 3, 4, 5:
Figure 3:
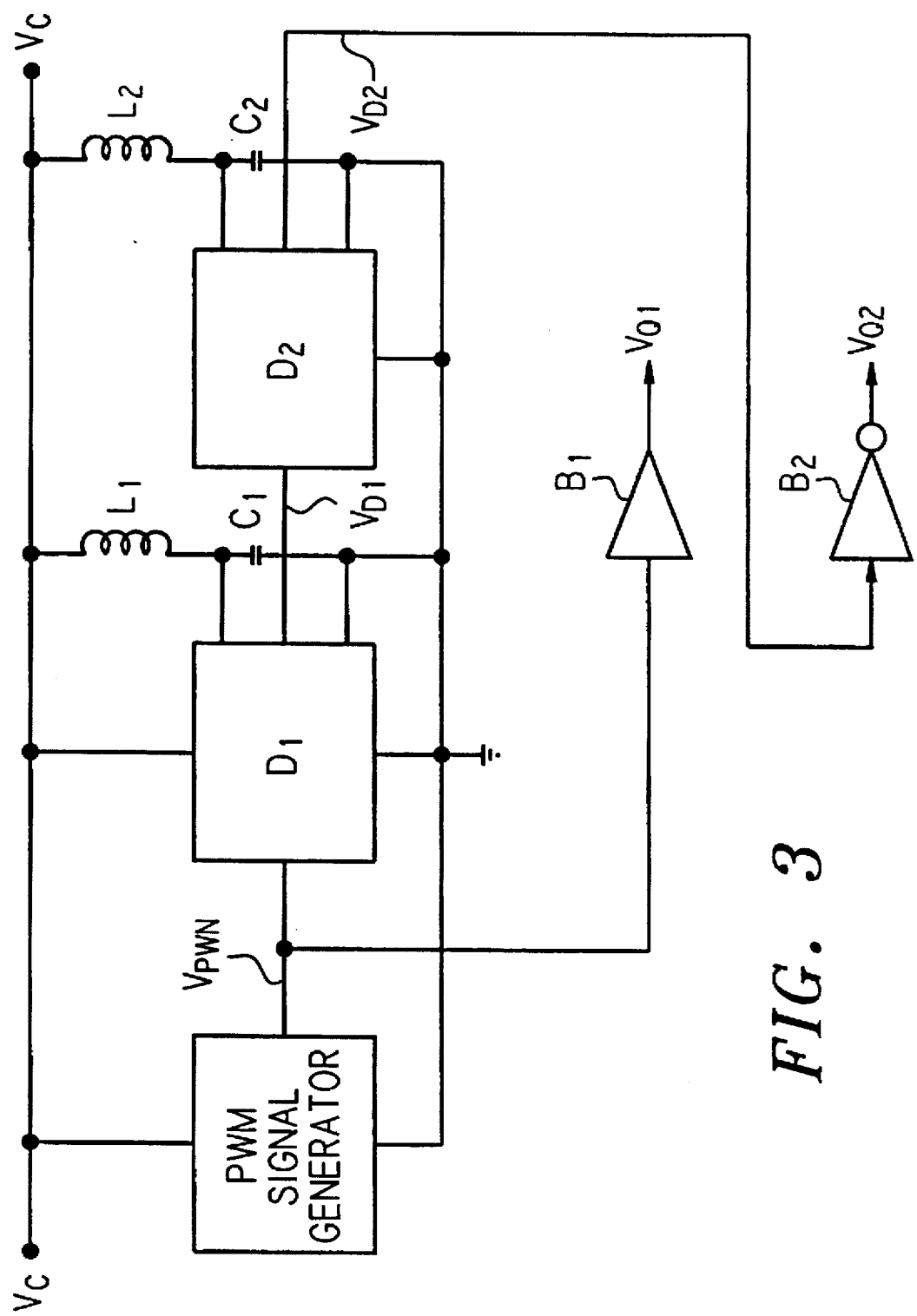
Figure 4:
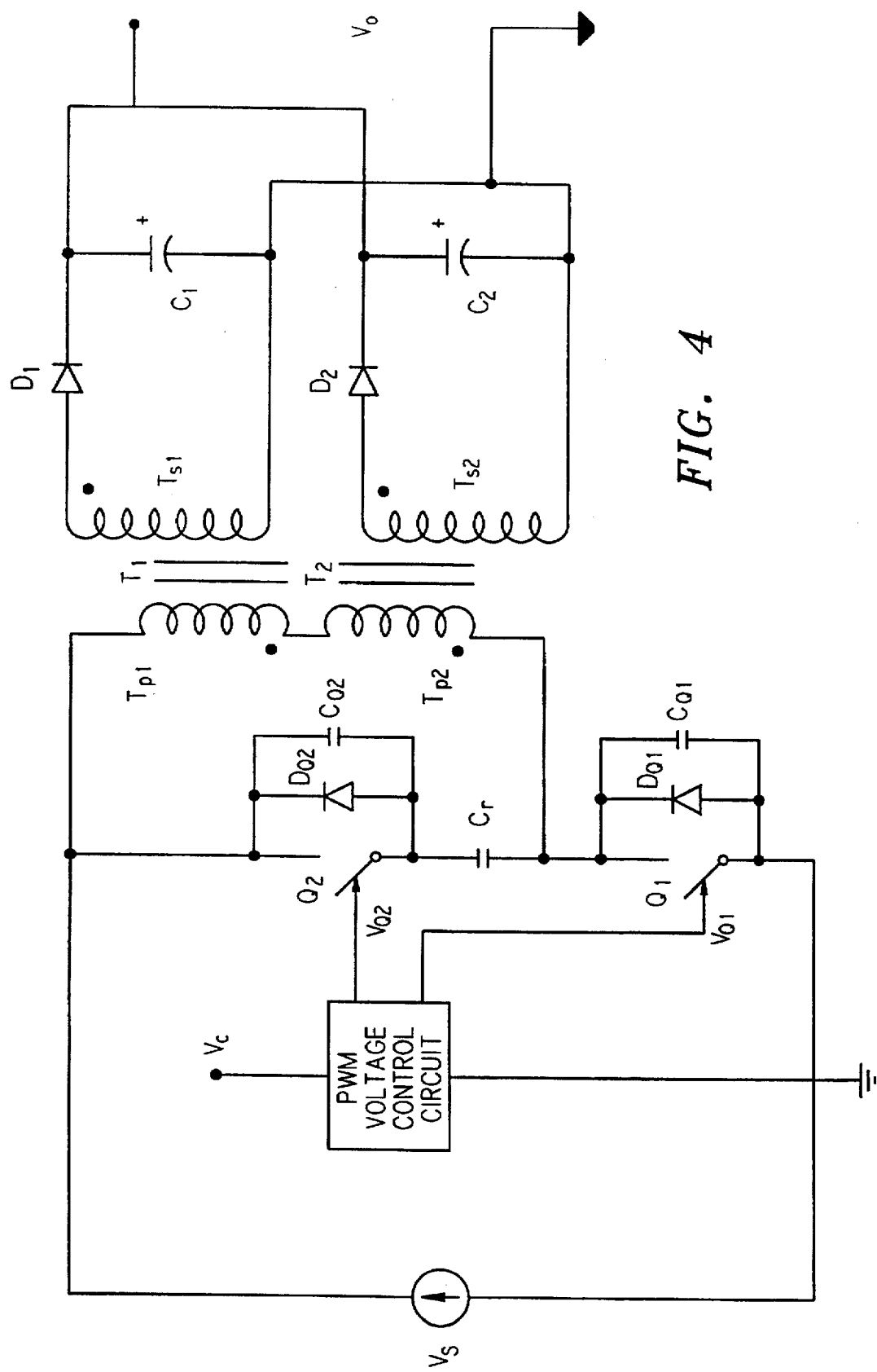

FIG. 5 depicts a combined forward-flyback topology, comprising a single transformer T. The primary side of the converter is configured identically to the flyback converter of FIG. 2, wherein a main semiconductor switch $Q_1$, preferably a MOSFET or other type of high-speed bi-polar switch, is provided to periodically electrically couple a primary winding $T_p$ of the transformer with a voltage source $V_s$. The main switch $Q_1$ is operated by a first pulse-width-modulated ("PWM") voltage control signal $V_{Q1}$ generated by a PWM voltage control circuit. The converter includes a primary-side resonant subcircuit comprising a resonant capacitor $C_r$ and a second semiconductor switch $Q_2$ ("resonant switch"), also preferably a MOSFET or other type of high speed bi-polar switch, operated by a second PWM voltage control signal $V_{Q2}$, also generated by the PWM voltage control circuit. When ON, the resonant switch $Q_2$ provides for bi-directional current circulation between the primary winding $T_p$ and resonant capacitor $C_r$.

The secondary, or "load" side of the converter differs from the converter of FIG. 2, wherein the transformer T comprises a pair of secondary windings, $T_{s1}$ and $T_{s2}$, respectively, connected in parallel, with $T_{s1}$ being flyback-polarity, and $T_{s2}$ being forward-polarity, respectively. The flyback-polarity secondary winding $T_{s1}$ is connected in series to a first output rectifying diode $D_1$ and a load storage capacitor $C_1$ for providing continuous, regulated power across an output voltage terminal $V_o$. The forward-polarity secondary winding $T_{s2}$ is connected in series with a second output rectifying diode $D_2$ and a load-side storage inductor $L_o$, which also supplies power across output terminal $V_o$, via a filter capacitor $C_2$. Preferably $C_2$ is much smaller than $C_1$ and operates as a high frequency filter only; i.e., $L_o$, not $C_2$, functions as the energy storing element for the forward-mode portion of the converter.

Figure 5:
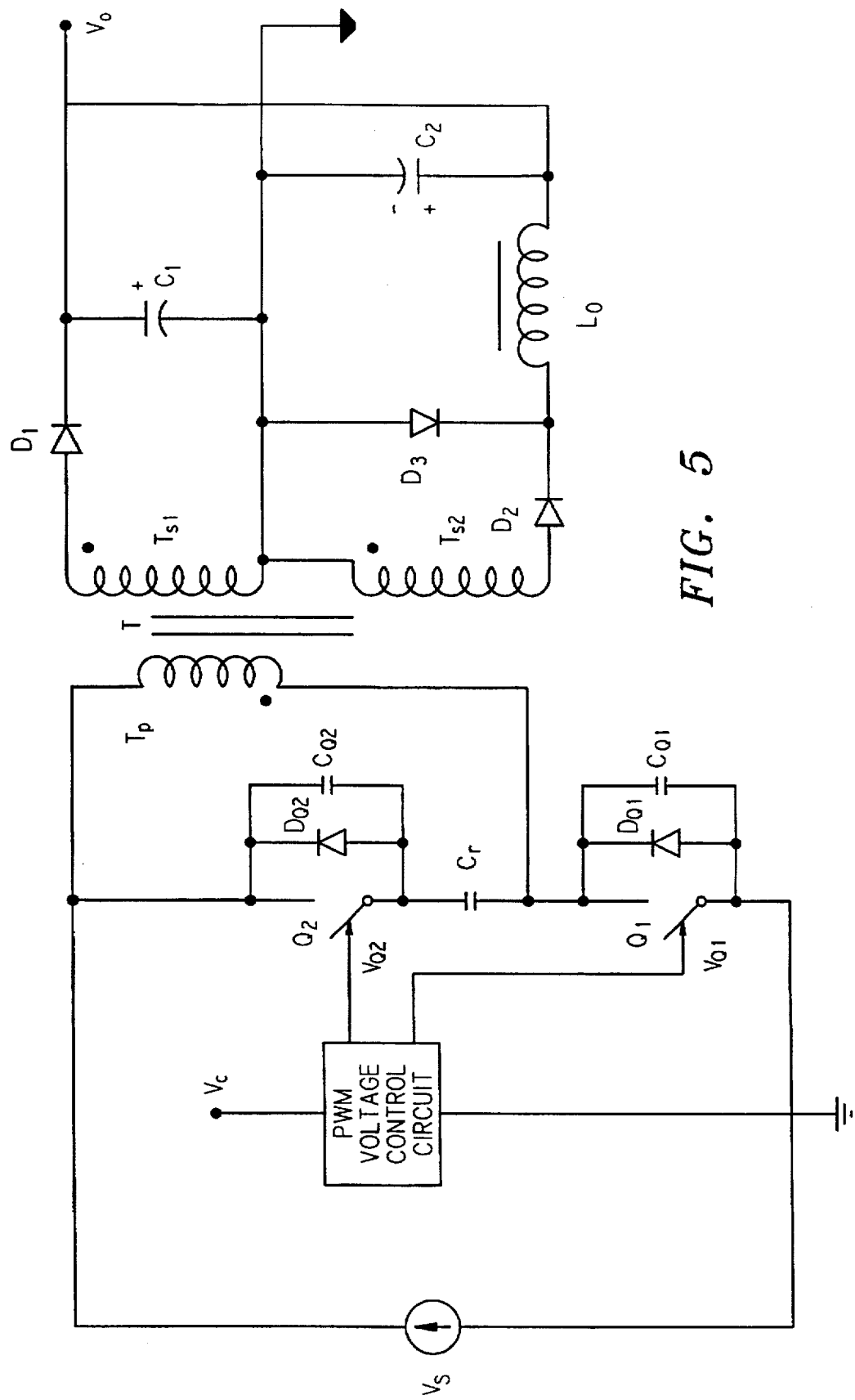
Figures 1, 5A:
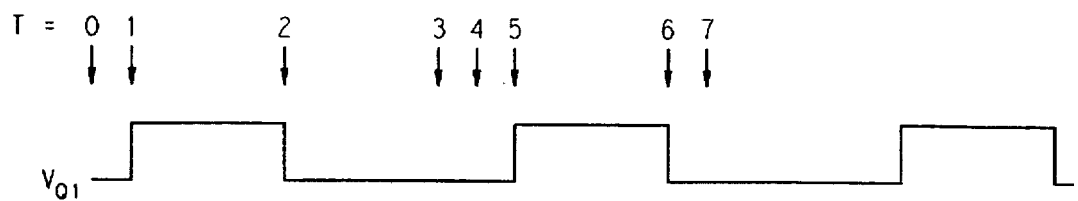
Figures 2, 5A:
Figures 3, 5A:
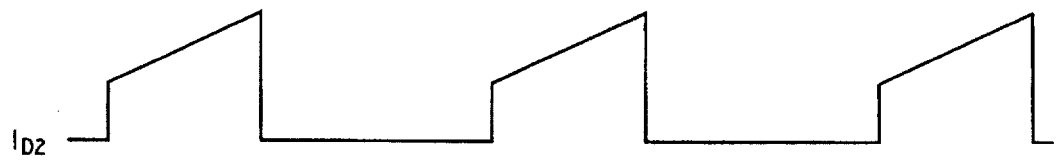
Figures 4, 5A:
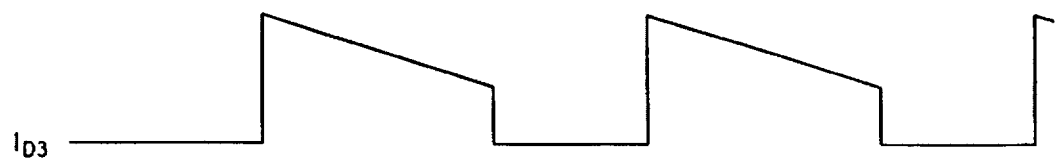

Operation of the converter illustrated in FIG. 5 is best described in conjunction with the switching control signals and current waveforms illustrated in FIGS. 5a-1 to 5a-4, as follows:

Main switch $Q_1$ is controlled by PWM voltage control signal $V_{Q1}$ in a manner substantially similar to the operation of the main switch of the resonant flyback converter topology illustrated in FIGS. 2 and 2a-1 to 2a-5. When $Q_1$ is ON, current from the voltage source $V_s$ circulates through primary winding $T_p$, with some of the energy being stored in the transformer T via its inductance. While $Q_1$ is ON, output rectifying diode $D_1$ remains reverse-biased because of the flyback-polarity of secondary winding $T_{s1}$, but output rectifying diode $D_2$ becomes forward-biased by the voltage rise across forward-polarity secondary winding $T_{s2}$, wherein some energy is directly transferred through $T_{s2}$, via diode $D_2$, charging load-side storage inductor $L_o$.

When $Q_1$ is turned OFF, the resonant flyback operation described above in conjunction with FIGS. 2 and 2a-1 to 2a-5 takes place, via the transfer of energy from the transformer T, in conjunction with the resonant capacitor $C_r$, through flyback-polarity secondary winding $T_{s1}$ and output rectifying diode $D_1$, respectively, charging load storage capacitor $C_1$. Simultaneously, energy stored in the load-side storage inductor $L_o$ will discharge to the load across $V_o$, operating as a "buck-loop" in parallel with load storage capacitor $C_1$ of the flyback-mode portion of the converter. As inductor $L_o$ discharges energy across output terminal $V_o$, some current will return from the load, circulating through a third rectifying diode $D_3$, back to $L_o$. Diode $D_3$ prevents current from bypassing the load-side inductor $L_o$ while $Q_1$ is ON.

By utilizing both forward and resonant flyback switching techniques, this aspect of the invention provides a DC-to-DC power converter that will provide greater utilization of the magnetic energy transfer system. However, as can be seen by the current waveforms illustrated in FIGS. 5a-1 to 5a-4, the hard switching across rectifying diodes $D_2$ and $D_3$, respectively, will cause losses from the current surges and drops at the ON/OFF switch points of these diodes.

FIG. 6 illustrates a start-up circuit for providing the switching control circuitry of a converter, such as the PWM voltage circuit disclosed in FIG. 3, with an initial, "start-up" voltage supply. The start-up circuit includes a first semiconductor switch $Q_3$, preferably a MOSFET or other high-speed bi-polar switch, that, when ON, electrically couples a voltage source $V_s$ with a holding capacitor $C_h$. The voltage source $V_s$ may be the same source used to supply voltage for the power converter operation. The holding capacitor $C_h$ is connected with the control circuitry of a power converter, in order to supply a minimum, threshold operating voltage $V_c$ to the circuitry for commencing operation of the converter. The control circuitry preferably includes a threshold voltage gate (not shown) to reject any input voltage from the holding capacitor $C_h$ that is less than the required threshold start-up voltage $V_c$, in order to avoid "false" start-ups or on/offs of the converter. Once the holding capacitor $C_h$ is sufficiently charged to provide the required threshold voltage to the control circuitry, the converter operation commences and the control circuitry is thereafter powered from an auxiliary output terminal $V_{AUX}$.

At start-up, a first lead from the voltage source $V_s$ is connected across a first pair of dividing resistors $R_1$ and $R_2$, respectively, and applied to an operating gate of switch $Q_3$. Preferably, the selected resistance of $R_1$ and $R_2$ is relatively high so that, in combination, $R_1$ and $R_2$ reduce the voltage level from $V_s$ to the required gate voltage bias of switch $Q_3$, thereby turning $Q_3$ ON when the start-up connection is made, without voltage surge interference. When ON, switch $Q_3$ electrically couples a second lead from the voltage source $V_s$, via a low power dissipating resistor $R_3$, with the holding capacitor $C_h$. In this manner, a current from the voltage source $V_s$ will be generated through $R_3$, charging the holding capacitor $C_h$. A zener diode Z is provided between the dissipating resistor $R_3$ and the holding capacitor $C_h$ to limit the voltage level that $C_h$ can be charged to, without danger of "run away" voltage surges, while still providing relatively high current to $C_h$.

An output lead is provided from the holding capacitor $C_h$ to an input terminal of a two-state voltage comparator U, which compares the voltage level at the input terminal to a steady-state reference voltage $V_{REF}$. When the voltage level at the comparator input terminal is less than reference voltage $V_{REF}$, the comparator outputs a "low" voltage signal, for example, the reference voltage, and when the voltage level at the comparator input terminal equals or exceeds reference voltage $V_{REF}$, the comparator outputs a "high" voltage signal. In the embodiment shown, the "high" voltage signal is derived from the converter control input voltage $V_c$. The reference voltage $V_{REF}$ is preferably low, e.g., no more than 2.5 volts. A pair of dividing resistors, $R_4$ and $R_5$, respectively, are provided between the holding capacitor $C_h$ and the comparator input terminal to reduce the voltage level from the holding capacitor $C_h$ according to a predetermined ratio, wherein the resistance values of resistors $R_4$ and $R_5$, respectively, are selected so that when the holding capacitor $C_h$ is initially charged to the threshold converter operating voltage, the voltage at comparator input terminal will equal the reference voltage $V_{REF}$ and the comparator output signal will switch from low to high output voltage signals.

The output voltage signal from the comparator U is applied to the operating gate of a second semiconductor switch $Q_4$, also preferably a MOSFET or other high speed bi-polar switch, wherein the low voltage signal is less than the gate voltage of $Q_4$, i.e., is not sufficient to turn switch $Q_4$ ON, and the high voltage signal equals or exceeds the gate voltage, i.e., will turn switch $Q_4$ ON. When switch $Q_4$ is ON, it electrically connects the operating gate of first semiconductor switch $Q_3$ directly to ground. This causes switch $Q_3$ to turn OFF, thereby disconnecting the voltage source $V_s$ from the holding capacitor $C_h$. In this manner, the electrical connection between the voltage source $V_s$ and the holding capacitor $C_h$ is broken once $C_h$ is initially charged to the threshold converter operating voltage $V_c$. Once the connection between the voltage source $V_s$ and the holding capacitor $C_h$ is broken, the voltage level $V_{ch}$ of the holding capacitor $C_h$ is determined by the voltage of the auxiliary output terminal $V_{AUX}$.

The output voltage signal from comparator U is also connected, via a feedback loop containing a resistor $R_6$, to the comparator input terminal. The feedback resistor $R_6$ acts in parallel with dividing resistors $R_4$ and $R_5$, respectively, wherein resistors $R_4$, $R_5$ and $R_6$, respectively, are configured so that when the comparator U outputs the low voltage signal, (i.e., during the initial charging of the holding capacitor $C_h$ at start-up), the comparator input terminal voltage $V_{IN}$ is determined by the following equation:

$$V_{IN}=V_{ch}*\{[R_5*R_6/(R_5+R_6)]/[R_4+[R_5*R_6/(R_5+R_6)]]\}.$$

where $V_{ch}$ is the voltage of the holding capacitor $C_h$.

However, when the comparator U outputs the high voltage signal, (i.e., after the holding capacitor $C_h$ is initially charged to the threshold converter operating voltage), the comparator input terminal voltage $V_{IN}$ is determined by a different equation, as follows:

$$V_{IN}=V_{ch}*\{R_5/[R_5+[R_4*R_6/(R_4+R_6)]]\}.$$

Thus, a hysteresis is created at the comparator input terminal, since, once the comparator switches from low to high output state, the high voltage output state will remain in place, even if the voltage level of the holding capacitor $C_h$ drops back below the converter threshold operating voltage. In preferred embodiments, the values of operative resistors $R_4$, $R_5$ and $R_6$, respectively, are selected so that the resulting hysteresis is sufficiently large to prevent normal fluctuations in the auxiliary terminal output voltage $V_{AUX}$ to cause the holding capacitor $C_h$ to be re-connected to the voltage source $V_s$, or to otherwise impact on the on-going operation of the converter control circuitry. In this manner, the connection between the voltage source and holding capacitor is protected from encountering rapid "on/offs", thereby minimizing undue stress and related losses on impacted electrical components.

Thus, various DC to DC converter topologies have been disclosed, including, among other inventive aspects, optimal resonant flyback switching techniques and start-up circuitry. While embodiments and applications of the present invention have been illustrated and described, it would be apparent to those skilled in the art that many modifications are possible without departing from the inventive concepts herein. For example, the inventors of the present invention have discovered that the beneficial variable inductance characteristics of the "dual-transformer" flyback topology illustrated in FIG. 4 can be achieved in a topology having single transformer by meticulously shaping the transformer's magnetic core element to include a substantial gap, or notch, located between two sections of a single primary winding. Also, one skilled in the art may configure power converter topologies having any number of primary and/or secondary windings arranged in an appropriate respective series/parallel relationship, and operated by the inventive switching principles and techniques set forth herein.

Further, while the benefits of the above topologies and control parameters have been discussed primarily in regard to high frequency converters or in the context of providing greater switching efficiency during light load conditions in converters required to serve a wide range of output load levels, the inventive techniques may be equally applicable for lower frequency converters or converters directed solely to light or heavy load level applications. Moreover, the start-up circuitry disclosed in FIG. 6 may be advantageously utilized in a wide variety of applications requiring an initial supply of voltage from a voltage source to a circuit operation, which is thereafter powered by an alternate voltage supply source.

The scope of the invention, therefore, is not to be restricted except in the spirit of the appended claims.

We claim:

1. A DC to DC flyback converter for supplying power derived from an input voltage source to one or more output terminals, comprising:

a first transformer which isolates the one or more output terminals from the input voltage source, said transformer having a primary winding;

a first semiconductor switch that, when ON, electrically couples said primary winding with the input voltage source;

a resonant capacitor;

a second semiconductor switch that, when ON, electrically couples said resonant capacitor with said primary winding; and control circuitry having means for alternately turning said first switch ON and OFF according to a first selected duty cycle and means for alternately turning said second switch ON and OFF according to a second selected duty cycle, wherein said second duty cycle is selected such that said second switch is turned ON only so long as required to discharge said resonant capacitor.

2. The DC to DC flyback converter of claim 1, wherein said means for turning said first switch ON and OFF comprise a first voltage control signal and said means for turning said second switch ON and OFF comprise a second voltage control signal.

3. The DC to DC flyback converter of claim 2, further comprising means for deriving said second voltage control signal from said first voltage control signal.

4. The DC to DC flyback converter of claim 3, wherein said means for deriving said second voltage control signal from said first voltage control signal comprise delay circuitry.

5. The DC to DC flyback converter of claim 1, further comprising a second transformer, said second transformer having a primary winding provided in series with said first transformer primary winding.

6. The DC to DC flyback converter of claim 5, said second transformer having substantially greater inductance than said first transformer.

7. The DC to DC flyback converter of claim 5, said first and second transformers each having a secondary winding, said respective secondary windings provided in parallel.

8. A DC to DC flyback converter for supplying power derived from an input voltage source to one or more output terminals, comprising:

a transformer which isolates the one or more output terminals from the input voltage source, said transformer having a primary winding;

a first semiconductor switch that, when ON, electrically couples said primary winding with the input voltage source;

a resonant capacitor;

a second semiconductor switch that, when ON, electrically couples said resonant capacitor with said primary winding; and control circuitry having means for alternately turning said first switch ON for a period of time $T_{ON}$ and OFF for a period of time $T_{OFF}$, respectively, and means for alternately turning said second switch ON for a period of time $T_{D2}$ and OFF for a period of time $T_{D3}$, respectively, wherein each second switch ON time period $T_{D2}$ commences after a time delay $T_{D1}$ following each instance said first switch is turned ON, and wherein said time period $T_{D2}$ is limited to the time required to discharge said resonant capacitor.

9. A method for controlling a DC to DC flyback converter, said converter comprising a transformer having a primary winding, a first semiconductor switch operated by a first voltage control signal according to a first duty cycle, said first switch, when ON, electrically coupling said primary winding with an input voltage, a resonant capacitor, and a second semiconductor switch operated by a second voltage control signal according to a second duty cycle, said second switch, when ON, electrically coupling said primary winding with said resonant capacitor, comprising the steps of:

selecting said first duty cycle so that said first switch is alternately turned ON for a period of time $T_{ON}$ and OFF for a period of time $T_{OFF}$, respectively; and selecting said second duty cycle so that said second switch is alternately turned ON for a period of time $T_{D2}$ and OFF for a period of time $T_{D3}$, respectively, wherein each second switch ON time period $T_{D2}$ commences after a time delay $T_{D1}$ following each instance said first switch is turned ON, and wherein said time period $T_{D2}$ is limited to the time required to discharge said resonant capacitor.

10. The method for controlling a DC to DC flyback converter of claim 9, comprising the further step of:

deriving said second voltage control signal from said first voltage control signal.

11. A DC to DC flyback converter for supplying power derived from an input voltage source to one or more output terminals, comprising:

a first transformer having a primary winding; and a second transformer having a primary winding, said first transformer primary winding provided in series with said second transformer primary winding, said first transformer having substantially greater inductance than said second transformer.

12. The DC to DC flyback converter of claim 11, said first and second transformers each having a secondary winding, said first transformer secondary winding provided in parallel with said second transformer secondary winding.

13. The DC to DC flyback converter of claim 11, further comprising:

a first semiconductor switch that, when ON, electrically couples said primary windings with the input voltage source;

a resonant capacitor;

a second semiconductor switch that, when ON, electrically couples said resonant capacitor with said primary windings; and control circuitry having means for alternately turning said first switch ON and OFF according to a first selected duty cycle and means for alternately turning said second switch ON and OFF according to a second selected duty cycle, wherein said second duty cycle is selected such that said second switch is turned ON only so long as required to discharge said resonant capacitor.

14. A DC to DC flyback converter for supplying power derived from an input voltage source to one or more output voltage terminals over a wide range of output load levels, comprising:

magnetic energy transfer means for isolating the one or more output voltage terminals from the input voltage source, said magnetic energy transfer means having an effective variable inductance.

15. The DC to DC flyback converter of claim 14, wherein the inductance of said magnetic energy transfer system is inversely related to the output load level.

16. The DC to DC flyback converter of claim 14, said magnetic energy transfer means comprising a pair of transformers, one of the transformers having substantially greater inductance than the other.

17. A DC to DC power converter for supplying power derived from an input voltage source to an output voltage terminal, comprising:

a transformer which isolates the output voltage terminal from the input voltage source, said transformer having a primary winding, a flyback-secondary winding and a forward-secondary winding, respectively;

a load-side inductor electrically coupled in series with said forward-secondary winding; and a load-side storage capacitor electrically coupled with said flyback-secondary winding, said inductor and capacitor connected in parallel across said output voltage terminal.

18. The DC to DC power converter of claim 17, further comprising:

a first semiconductor switch that, when ON, electrically couples said primary winding with the input voltage source, said transformer both storing energy and transferring energy through said forward-secondary winding, respectively.

19. The DC to DC power converter of claim 18, further comprising:

a resonant capacitor;

a second semiconductor switch that, when ON, electrically couples said resonant capacitor with said primary winding; and control circuitry having means for alternately turning said first switch ON and OFF according to a first selected duty cycle and means for alternately turning said second switch ON and OFF according to a second selected duty cycle.

20. Start-up circuitry for connecting a voltage supply for the control circuitry of a power converter to a voltage source, comprising:

means including a first semiconductor switch to connect the voltage supply to the voltage source upon initial start-up of the power converter;

means including a second semiconductor switch and a comparator to maintain said connection until the voltage supply is charged to a first voltage level and then discontinuing said connection until the voltage of said voltage supply drops below a second voltage level, said first voltage level being greater than said second voltage level, wherein said second switch is controlled by an output signal from said comparator and said first switch is controlled by said second switch.

21. The start-up circuitry of claim 20, wherein said means to connect comprise a first semiconductor switch that, when ON, electrically couples the voltage supply to the voltage source, and said means to maintain said connection comprise a second semiconductor switch that, when ON, electrically couples an activating gate of said first semiconductor switch to ground, said second semiconductor switch being activated by an output signal of a voltage comparator.

22. The start-up circuitry of claim 21, said voltage comparator comparing an input voltage to a reference voltage, said input voltage determined in part by the voltage level of the voltage supply.

23. The start-up circuitry of claim 20, said first voltage level selected at a level sufficient operating voltage to the control circuitry such that said control circuitry can commence operation and thereafter be powered by an auxiliary converter output terminal, said second voltage level selected to allow for typical start-up converter output voltage fluctuations without causing said connection to be reestablished.

24. A DC to DC flyback converter for supplying power to one or more output terminals from an input voltage source, comprising:

a first transformer which isolates the one or more output terminals from the input voltage source, said transformer having a primary winding;

a first semiconductor switch that, when ON, electrically couples said primary winding with the input voltage source;

a resonant capacitor;

a second semiconductor switch that, when ON, electrically couples said resonant capacitor with said primary winding;

control circuitry having means for alternately turning said first switch ON and OFF according to a first selected duty cycle and means for alternately turning said second switch ON and OFF according to a second selected duty cycle, wherein said second duty cycle is selected such that said second switch is turned ON only so long as required to discharge said resonant capacitor; and start-up circuitry having means including a first semiconductor switch to connect a voltage supply for said control circuitry to the input voltage, said connection being maintained from start-up by means including a second semiconductor switch and a comparator until said voltage supply is charged by the input voltage to a first selected voltage level and then discontinued until said voltage supply drops below a second selected voltage level, wherein said second switch is controlled by an output signal from said comparator and said first switch is controlled by said second switch.

* * * * *